MAGNETIC CORE CONVERGING SWITCH

Filed Nov. 30, 1962

INVENTOR
E.E. NEWHALL
BY Lucian C. Canepa
ATTORNEY

United States Patent Office 3,257,565

Patented June 21, 1966

3,257,565

MAGNETIC CORE CONVERGING SWITCH

Edmunde E. Newhall, Brookside, N.J., assignor to Bell Telephone Laboratories, Incorporated, New York, N.Y., a corporation of New York Filed Nov. 30, 1962, Ser. No. 241,334
4 Claims. (Cl. 307—88)

Figures 1, 2:
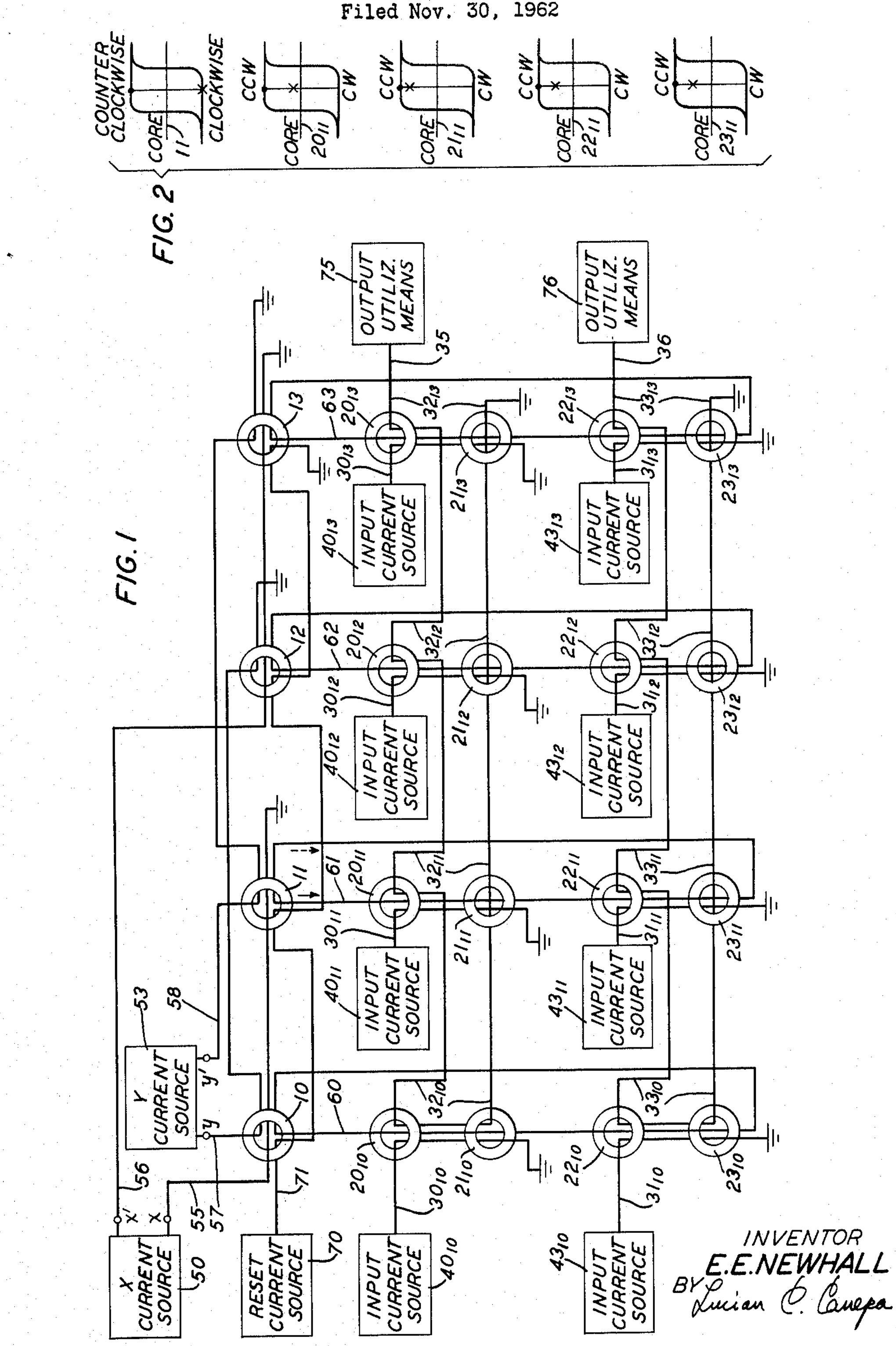

This invention relates to magnetic circuits and, more specifically, to a magnetic core arrangement which functions as a converging switch.

Electronic circuits which supply a selected one of a plurality of groups of information digits to a common set of output terminals are well known. Perhaps the most common and extensively employed of such circuits is the word-organized, random-accessed, information storage memory. Typically, digital information is supplied to a store during a write-in process and stored at discrete address locations in binary memory elements, such as tunnel diodes and square loop magnetic elements. When the stored information is desired, the corresponding address is interrogated, and the information word stored thereat is supplied to a common set of output terminals. A new write-in cycle may or may not be required depending upon whether the interrogation process is of the destructive or nondestructive type, respectively.

However, where the input information which is represented by the digit values included in the plurality of stored information words is continuously changing, a storage memory often fails to render satisfactory performance. In response to each binary input information digit change, the store must initiate a new write-in cycle, and the store cannot be interrogated during this period. This becomes an especially serious limitation when the number of information digits becomes relatively large. By employing a converging switch in place of the information store, however, the input information may be continuously interrogated virtually independent of the rate of change of the input digit values.

It is thus an object of the present invention to provide an improved magnetic converging switch.

More specifically, an object of the present invention is the provision of a magnetic core converging switch wherein a selected one of a plurality of groups of information bits is supplied to a common set of output terminals.

It is another object of the present invention to provide a magnetic core converging switch which supplies a common set of output terminals with one of a plurality of groups of information bits which may be continuously varying.

It is still another object of the present invention to provide a magnetic core converging switch which does not utilize either temporary or permanent information storage.

These and other objects of the present invention are realized in a specific illustrative magnetic core converging switch employing a plurality of ferromagnetic, toroidal driving cores, each of which is coupled to a plurality of square loop bit cores by a short-circuited driving winding. Each pair of bit cores represent one information address. Also coupled to each core pair are an input and an output winding which are linked to each core of the pair in an opposite polarity. Binary input information is manifested by the presence or absence of a monopolar current being supplied to a corresponding input winding.

Initially, all the bit cores are saturated in a polarity opposite to the driving winding flux direction. One set of bit cores is interrogated by reversing the flux in the corresponding driving core, thereby energizing the driving winding which tends to switch the flux in the bit cores coupled thereto. A zero net output voltage is induced in an output winding when the corresponding input winding is de-energized. Conversely, an output voltage is generated in an output winding associated with an energized input winding.

It is thus a feature of the present invention that a magnetic core converging switch include a plurality of groups of square loop ferromagnetic, toroidal cores, each group including a driving core and a plurality of paired bit cores, each pair of bit cores representing one information address, a plurality of short-circuited driving windings each coupling a driving core to each of the bit cores associated therewith, and a plurality of input windings and a plurality of output windings, each pair including one of the input and one of the output windings being coupled to each core of a different core pair in an opposite polarity.

It is another feature of the present invention that a magnetic core converging switch include a flux-limited driving source, a pair of bit cores coupled thereto by a short-circuited driving winding, an input and an output winding each coupled to each core of the bit core pair in an opposite polarity, and an input current source connected to the input winding.

A complete understanding of the present invention and of the above and other features, variations and advantages thereof may be gained from a consideration of the following detailed description of an illustrative embodiment thereof presented hereinbelow in connection with the accompanying drawing, in which:

FIG. 1 is a diagram of a specific illustrative magnetic core converging switch which embodies the principles of the present invention; and FIG. 2 is a diagram of the hysteresis characteristics for a selected group of toroidal cores illustrated in FIG. 1.

Referring now to FIG. 1, there is shown a specific illustrative magnetic core converging switch including four ferromagnetic, square loop toroidal cores 10 through 13. Each of the cores 10 through 13 has coupled thereto four ferromagnetic, square loop toroidal cores 20 through 23 by a short-circuited driving winding 60 through 63, respectively. The driving cores 10 through 13 and the plurality of bit cores 20 through 23 associated therewith may each be advantageously characterized by a like flux-carrying capacity. It is noted that each of the cores 20 through 23, along with a plurality of other elements to be described hereinafter, is further designated with a subscript corresponding to the particular driving core with which it is associated.

Also coupled to the cores 10 through 13 are a plurality of selection windings 55 through 58. The selection winding 55 is coupled to the cores 10 and 11 while the winding 56 is coupled to the cores 12 and 13. Similarly, the selection winding 57 is coupled to the cores 10 and 12 and the winding 58 is coupled to the cores 11 and 13. An X current source 50 is provided to supply a relatively high or a relatively low monopolar current to two output terminals $x$ and $x'$ which are respectively connected to the windings 55 and 56. A Y current source 53 having output terminals $y$ and $y'$ respectively connected to the windings 57 and 58 is also provided, with the source 53 being essentially identical to the X current source 50. The current supplied by the sources 50 and 53 are of a magnitude such that a single energized selection winding coupled to a core only switches a shuttle flux therein and partially selects the core. If two coincidently energized windings are coupled to a core, however, the core will reverse its remanent saturation state. In addition, a reset winding 71 is coupled to each of the cores 10 through 13 in a direction opposite to the selection winding polarity, and a reset current source 70 is employed to supply a resetting current pulse thereto following each core interrogation.

Each pair of bit cores 20 and 21, and 22 and 23, comprise one address location. Coupled to each of the core pairs 20 and 21 are an input winding 30 and an output winding 32. In a like manner, an input winding 31 and an output winding 33 are coupled to each of the cores 22 and 23. The input and output windings 30 and 32 are in every case coupled to the core 20 in a like polarity as the associated driving winding, and are coupled to the core 21 in a polarity opposite to the driving winding. Similarly, the input and output windings 31 and 33 are coupled to the cores 22 in a like sense as the driving winding and coupled to the cores 23 in a direction opposite to the driving winding. The individual output windings 32 coupled to the cores 20 and 21 are serially connected to form an output circuit 35 which is connected to an output utilization means 75, while the output windings 33 linked to the cores 22 and 23 are also serially interconnected thereby forming an output circuit 36 which is joined with an output utilization means 76. Each of the input windings 30 and 31 has one terminal thereof grounded and the remaining terminal connected to an input current source 40 or 43, respectively.

The input intelligence to the magnetic core converging switch of FIG. 1 is manifested by the presence or absence of a monopolar current supplied by each of the input sources 40 and 43. These sources may advantageously comprise, for example, a plurality of control circuit output signals, or currents representative of a plurality of digital bits from a computer or switching system. The function of the FIG. 1 arrangement is to supply to the common output utilization means 75 or 76 information relating to either the presence or absence of a current supplied by a particular set of information sources 40 and 43 associated with a selected one of the cores 10 through 13.

Assume now that each of the driving cores 10 through 13 and each of the bit cores 20 through 23 associated therewith are each saturated in the counter-clockwise direction as shown for the cores 11 and $\mathbf{20_{11}}$ through $\mathbf{23_{11}}$ by the dots on the corresponding FIG. 2 hysteresis characteristics. This may be accomplished, for example by activating each of the X and L current sources 50 and 53 to saturate each of the cores 10 through 13 in the clockwise, selection direction and then resetting the cores 10 through 13 by supplying a current from the reset current source 70 to the reset winding 71. This switches each of the driving cores 10 through 13 to the desired counter-clockwise remanent storage polarity and induces a current, shown by the dashed arrow in FIG. 1 for the core 11, in each of the driving windings 60 through 63. This current is in the proper polarity to set the bit cores 20 through 23 coupled to each of the windings 60 through 63 to a counterclockwise storage condition.

To illustrate a typical cycle of circuit operation, assume that it is desired to interrogate the cores $\mathbf{20_{11}}$ through $\mathbf{23_{11}}$ associated with the driving core 11. Further, assume the input source $\mathbf{40_{11}}$ associated with the bit cores $\mathbf{20_{11}}$ and $\mathbf{21_{11}}$ supplies a current to the input winding $\mathbf{30_{11}}$ coupled thereto, while the source $\mathbf{43_{11}}$ does not supply a current to the input winding $\mathbf{31_{11}}$ coupled to the cores $\mathbf{22_{11}}$ and $\mathbf{23_{11}}$.

To interrogate the information supplied by the sources $\mathbf{40_{11}}$ and $\mathbf{43_{11}}$, the driving core 11 is switched by a relatively high current supplied to the $x$ selection terminal by the current source 50 and by a relatively high current supplied to the $y'$ terminal of the Y current source 53. These coincident magnetizing drives applied to the core 11 by the selection windings 55 and 58 are sufficient to reverse the remanent storage polarity of the driving core 11 from an initial condition in the counter-clockwise direction, shown by the dot in FIG. 2, to the opposite, clockwise direction indicated by the cross in FIG. 2. This flux reversal induces a current in the short-circuited coupling winding 61 in a direction shown by the solid arrow adjacent core 11 in FIG. 1.

With respect to the cores $\mathbf{22_{11}}$ and $\mathbf{23_{11}}$, the input winding $\mathbf{31_{11}}$ associated therewith is de-energized, and hence the energized driving winding 61 affects both cores in an identical manner, and an equal amount of flux is switched in each. As the output windings $\mathbf{33_{11}}$ associated with these cores are coupled to each in a different polarity, the equal flux reversals induce cancelling voltages in the series-connected output circuit 36, and hence a zero net voltage is supplied to the output utilization means 76.

However, the input winding $\mathbf{30_{11}}$ coupled to the cores $\mathbf{20_{11}}$ and $\mathbf{21_{11}}$ is energized and produces a magnetizing force which aids that supplied by the activated driving winding 61 to the core $\mathbf{20_{11}}$, but detracts from the field strength supplied by the winding 61 to the core $\mathbf{21_{11}}$. As is well known, the speed of domain wall motion in a ferro-magnetic material is directly proportional to the strength of the applied magnetic magnetizing field. Hence, switching takes place faster in the core $\mathbf{20_{11}}$ with the additive fields than in the core $\mathbf{21_{11}}$ with the detracting fields. Also, the net flux change occurring in all the cores 11 and $\mathbf{20_{11}}$ through $\mathbf{23_{11}}$ coupled to the short-circuited driving winding 61 must cancel, leaving a zero net resulting flux change. If this were not the case, and some net flux change transpired, a net voltage would be induced in the driving winding 61, and this would, of course, be impossible in a short-circuited winding. Hence, the cores $\mathbf{20_{11}}$ and $\mathbf{21_{11}}$ must switch a given amount of flux equal to one-half the flux switched in the core 11 which, when added to the equal flux changes produced in the cores $\mathbf{22_{11}}$ and $\mathbf{23_{11}}$ which are each equal in magnitude to one-quarter of the flux switched in the core 11, will just offset that produced by the driving core 11. Thus, as the amount of flux to be changed is fixed, or in other words since the cores $\mathbf{20_{11}}$ and $\mathbf{21_{11}}$ are driven by a flux-limited source, and as the core $\mathbf{20_{11}}$ is switching at a faster rate than the core $\mathbf{21_{11}}$, a larger flux change takes place in the core $\mathbf{20_{11}}$ than in the core $\mathbf{21_{11}}$. This new core remanent flux orientation for the cores $\mathbf{20_{11}}$ through $\mathbf{23_{11}}$ is indicated by the respective crosses on the FIG. 2 hysteresis characteristics.

Since a larger flux change takes place in the core $\mathbf{20_{11}}$ than in the core $\mathbf{21_{11}}$, a larger voltage is induced in the output winding $\mathbf{32_{11}}$ coupled to the core $\mathbf{20_{11}}$ than in the output winding $\mathbf{32_{11}}$ coupled to the core $\mathbf{21_{11}}$. As these are the only signals induced in the output circuit 35 which includes these output windings, a net output voltage is in this case produced, and this resulting signal is supplied to the output utilization means 75. Hence, the output means 75 is supplied and the output means 76 is not supplied, with an output signal. This corresponds to the input source $\mathbf{40_{11}}$ supplying an input current and the source $\mathbf{43_{11}}$ failing to supply an input current.

After the signals are supplied to the respective output means, the reset source 70 supplies a current pulse to the reset winding 71. This energized winding has no effect on the cores 10, 12, or 13 which are already saturated in the counter-clockwise reset polarity, but does produce a magnetomotive force in the core 11 which switches this core from a clockwise orientation back to the counter-clockwise reset polarity. When the core 11 switches state it induces a current in the short-circuited driving winding 61 in the direction of the dashed vector shown in FIG. 1, and this current switches each of the bit cores $\mathbf{20_{11}}$ through $\mathbf{23_{11}}$ back to a counter-clockwise remanent hysteresis saturation condition, which was the initial condition assumed above. At this time, the FIG. 1 arrangement is in the proper condition to accept another set of interrogation signals supplied by the sources 50 and 53 and to detect the condition of a different pair of input current sources 40 and 43 in response thereto.

It is noted, at this point, that the driving core 11 in the FIG. 1 arrangement might have comprised a core of an arbitrary flux capacity. For example, if $k$ units of flux were switched in the driving core 11 by the energized selection windings, a total of $k$ flux units would have to be switched in all of the cores $\mathbf{20}_{11}$ through $\mathbf{23}_{11}$. As the flux capacity of the driving core becomes smaller, less power is dissipated in each of the bit cores as less flux is switched therein, and a proportional decrease in core heating results. Thus, the FIG. 1 arrangement may be operated at a higher circuit repetition rate by decreasing the magnitude of the driving flux. However, as the driving core flux change decreases, the magnitudes of the output signals also diminish.

It should also be observed that the unbalance in the flux switching of a bit core pair is dependent upon the magnitude of the current supplied by the corresponding input current source. For example, as the current becomes greater, the unbalance increases. Hence, the FIG. 1 arrangement is sensitive to input current magnitude and may advantageously be employed for signal amplification and translation.

Summarizing, an illustrative magnetic core converging switch made in accordance with the principles of the present invention employs a plurality of ferromagnetic, toroidal driving cores, each of which is coupled to a plurality of square loop, ferromagnetic bit cores by a short-circuited driving winding. Each pair of bit cores represents one information address. Also coupled to each core are an input and an output winding both of which are linked to each core of the pair in an opposite polarity. Binary input information is manifested by the presence or absence of a monopolar current being supplied to a corresponding input winding.

Initially, all the bit cores are saturated in a polarity opposite to the driving winding flux direction. One set of bit cores is interrogated by reversing the flux in the corresponding driving core thereby energizing the driving winding, which tends to switch the flux in the bit cores coupled thereto. A zero net output voltage is induced in an output winding when the corresponding input winding is de-energized. Conversely, an output voltage is generated in an output winding associated with an energized input winding.

It is to be understood that the above-described arrangements are only illustrative of the application of the present invention. Numerous other arrangements may be devised by those skilled in the art without departing from the spirit and scope of the present invention. For example, while four driving cores 10 through 13 and four bit cores 20 through 23 coupled thereto were illustrated in FIG. 1, it should be clear that any number of driving cores and any number of bit cores coupled thereto might well have been employed.

In addition, each pair of bit cores can be coupled to the corresponding driving core by an individual short-circuited driving winding. If this were done, it is clear that the flux change generated by switching the driving core must be identically compensated for by an equal and opposite flux change in each pair of bit cores, as again no net voltage may be induced in each short-circuited driving winding. If no input current were supplied to such a core pair, the cores would switch equally and cancelling output voltages would be induced in the corresponding output winding. However, if an input current were supplied thereto, one core would switch faster than the other, and a net output voltage would be produced.

Also, the driving cores 10 through 13 and the bit cores 20 through 23 may be replaced by tensor wires, twistor wires, thin film elements, or any other of the well known plurality of square loop, ferromagnetic structures.

What is claimed is:

1. In combination in a converging switch, $2n \cdot k$ square loop ferromagnetic bit cores each characterized by a flux carrying capacity of $r$ flux units and a coercive switching threshold of $m$ magnetizing units, where $n$ and $k$ are independent positive integers and $m$ and $r$ are independent positive numbers, $k$ ferromagnetic driving cores each characterized by a flux carrying capacity of $q$ flux units wherein $$0<q<n \cdot r$$

$k$ short-circuited driving windings each coupling $2n$ different bit cores to a different one of said $k$ ferromagnetic driving cores, each of said driving windings being coupled in a like polarity to said associated bit cores, $n \cdot k$ output windings and $n \cdot k$ input windings, each pair including one of said input and one of said output windings being coupled to a different pair of said bit cores, each of said input and output winding pairs being coupled to one core of the associated core pairs in a like polarity as the associated driving winding and coupled to the other core included in said core pair in a polarity opposite to said associated short-circuited driving winding, $n$ output circuits each comprising the serial interconnection of $k$ different output windings, and $n \cdot k$ input magnetizing force sources for selectively supplying continuous magnetizing forces of an amplitude less than $m$ units to said input windings.

2. A combination as in claim 1 further including means for altering the remanent hysteresis state of a selected one of said $k$ ferromagnetic driving cores.

3. A combination as in claim 2 further including $n$ output responsive means each connected to a different one of said $n$ output circuits.

4. A combination as in claim 3 further including $k$ reset windings each coupled to a different one of said $k$ driving cores, and a reset current source, said reset current windings being serially interconnected and further connected to said source of reset current.

References Cited by the Examiner

UNITED STATES PATENTS

| | | | |
|---|---|---|---|
| 2,768,367 | 10/1956 | Rajchman | 340—174 |
| 2,910,674 | 10/1959 | Wittenberg | 340—174 |
| 3,075,185 | 1/1963 | Schoenmakers | 340—174 |

OTHER REFERENCES

Publication I, Computer Memories, A Survey of the State of the Art by Jan Rajchman; Proceedings of the IRE, pages 111–113, January 1961.

IRVING L. SRAGOW, *Primary Examiner.*

S. M. URYNOWICZ, *Assistant Examiner.*